Nov. 16, 1948.  J. P. JOHNSON ET AL  2,453,919
GARMENT HANGER SUPPORT
Filed June 27, 1946
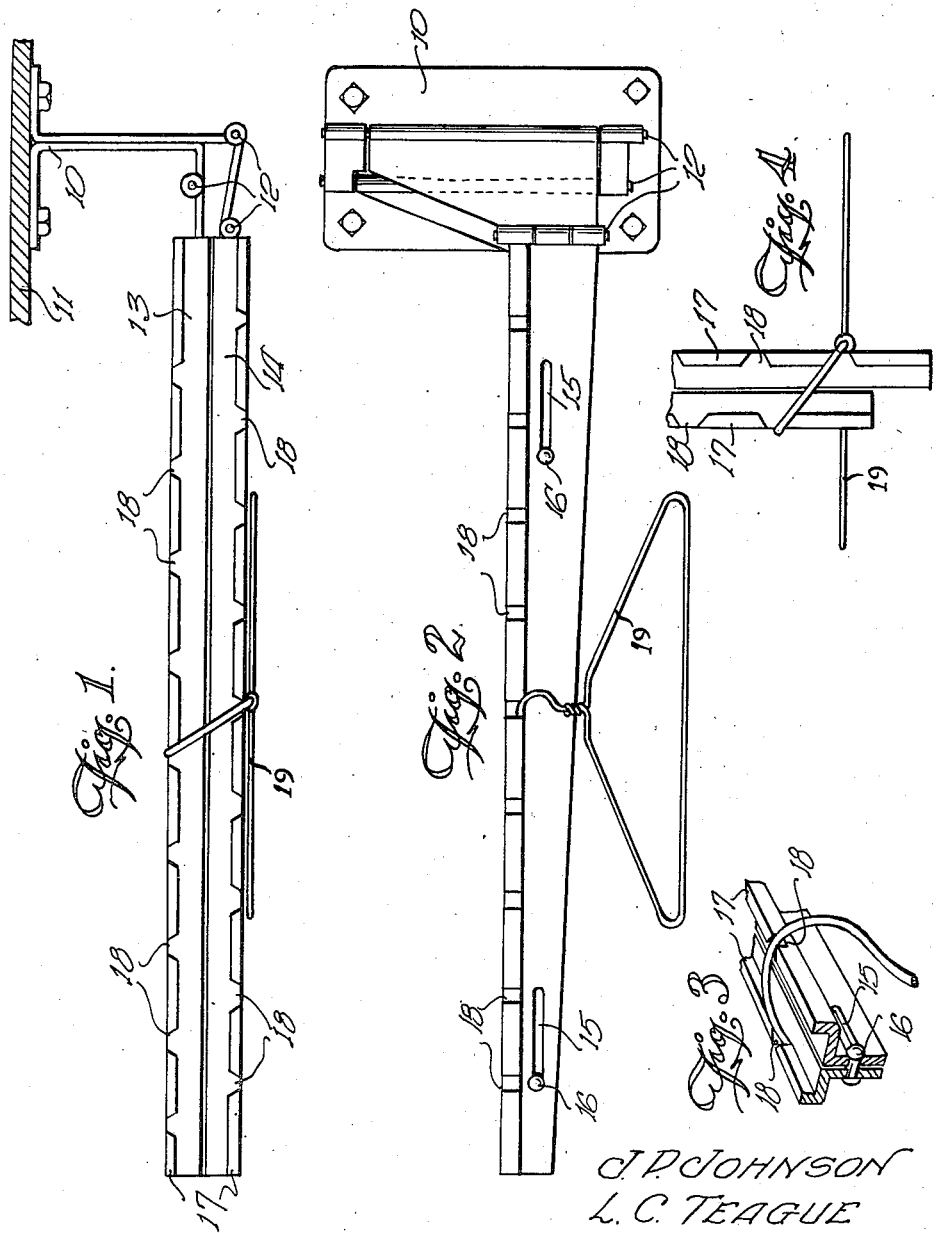
J. P. JOHNSON
L. C. TEAGUE
INVENTORS Patented Nov. 16, 1948

2,453,919

UNITED STATES PATENT OFFICE 2,453,919

GARMENT HANGER SUPPORT

John P. Johnson and Leonard C. Teague, Dallas, Tex.

Application June 27, 1946, Serial No. 679,711

5 Claims. (Cl. 211—96)

This invention relates to supporting members within closets or cabinets for receiving hangers and more particularly to supporting members having one end fixedly mounted within closets or cabinets with the arm thereof capable of displacement to points outside the confines of lines defined by the walls and door or doors of said closets or cabinets.

The objects of this invention are, first, to provide a supporting member capable of receiving and retaining the conventional types of hangers; second, to provide a supporting member whose arm is displaceable in substantially the same horizontal plane as that of its normal position within the closet or cabinet.

Another object of the invention is to provide a supporting member the arm of which is hinged to a fixed bracket with the two complementary sections of said arm relatively and opposingly displaceable longitudinally.

Still another object of the invention is to provide a supporting member having an outwardly displaceable arm the corresponding longitudinal displacement of its complementary sections created in such displacement causing a change in the angle of hangers supported by said arm thus permitting a greater utilization of the space within closets or cabinets and more particularly those of shallow depth.

With the foregoing objects as paramount, the invention has further reference to certain features of accomplishment which will become apparent as the description proceeds when taken in connection with the accompanying drawings, wherein:

Figure 1 is a plan view of a supporting member constructed according to the invention.

Figure 2 is a front elevation of a supporting member constructed according to the invention showing the arm thereof in its normal position.

Figure 3 is a fragmentary perspective view of the two complementary sections of the arm of a supporting member constructed according to the invention, and Figure 4 is a fragmentary plan view of the outward ends of the two complementary sections of the arm of a supporting member constructed according to the invention and showing their relative positions when arm is outwardly displaced.

Continuing with a more detailed description of the drawings, reference numeral 10 denotes a bracket fixedly attached by suitable means to an inside wall 11 of a closet or cabinet, the outward part of said bracket having a multiplicity of offset hinges 12 operatively supporting, in a horizontal plane, an inner complementary section 13 and an outer complementary section 14, said complementary sections comprising the arm of the supporting member.

The relative positions of the inner complementary section 13 and the outer complementary section 14 are retained by means of corresponding elongated slots 15 in each of the said complementary sections and through which are inserted bolts or pins 16, the assembly of the bolts and slots permitting opposing longitudinal displacement of said slots in substantially the same horizontal plane.

Outwardly and upon the upper portion of the inner complementary section 13 and the outer complementary section 14 of the arm are flanges 17 extending the full length of the respective complementary sections, said flanges having evenly spaced recesses 18 with the inner opening of said recesses being somewhat larger than the outer openings thereof. These recesses 18 of the complementary sections comprising the arm are so spaced that when the arm is in its normal horizontal position within the closet or cabinet they are opposingly offset in uniformity.

In the use of a supporting member constructed according to the invention the multiplicity of offset hinges operatively supporting the complementary sections comprising the arm permits the displacement of said arm, outwardly, in substantially the same horizontal plane as that of its normal position within the closet or cabinet. Upon such outward displacement of the arm, and by virtue of the offset hinges, the complementary sections of said arm are individually displaced longitudinally in opposite directions, such longitudinal displacement of the complementary sections causing an identical relative displacement of the recesses 18 in said complementary sections.

When the arm is swung outward and extended as shown in Figure 4, the hanging hook of a conventional clothes hanger, which is turned to an angle of approximately 45 degrees to that of the body of the hanger, is hung over the arm and in the respective recesses in the complementary sections comprising said arm with the result that the body of the hanger is hanging at right angles to the extended arm. When the arm is returned to its normal horizontal position within the closet or cabinet the resultant relative longitudinal displacement of the inner and outer complementary sections and their respective recesses causes the body of the hanger to turn to a position substantially parallel to the arm as shown in Figure 1. Similarly, by a turn of the hanging hook of the hanger to a degree less than the aforementioned 45 degrees the body of the hanger may be caused to hang in a position transverse, in small degree, to the longitudinal axis of said arm thus permitting an over-lap of a hanger or hangers adjacent to said hanger. Therefore, it becomes obvious that the use of a supporting member such as described permits a greater utilization of the space within a closet or a cabinet of shallow depth than is possible with supporting members of conventional design.

Manifestly, the construction of a supporting member as shown and described is capable of some modification and such modification may be construed as falling within the scope and meaning of the appended claims and is also considered to be within the spirit and intent of the invention.

What is claimed is:

1. In a device of the character described, a supporting member including a bracket, a plurality of hinges relatively offset horizontally and operatively supporting an inner and an outer complementary section each of which are longitudinally displaceable in opposite directions, said complementary sections comprising an arm displaceable in substantially the same horizontal plane as that of its normal position within a closet, said complementary sections having individual flanges at their uppermost part in which are evenly spaced recesses opposingly offset in relation to each other in normal position, said complementary sections being retained in adjacent parallel position by means of bolts inserted in elongated slots correspondingly positioned therein.

2. In supporting members, a supporting member including a bracket fixedly attached to the inside wall of a cabinet, a plurality of hinges relatively offset horizontally and to which are operatively attached for support two complementary sections of an arm, said arm being displaceable in substantially the same horizontal plane as that of its normal position within said cabinet, displacement of said arm causing a resultant longitudinal displacement in opposite directions of said complementary members, said complementary members being retained in adjacent position by means of correspondingly positioned slots therein through which pins are inserted, and having at their uppermost extremities flanges in which are evenly spaced recesses for receiving hanger hooks, said recesses being offset uniformly from those in the flange of the complementary section adjacent thereto.

3. In supports for hangers, a supporting member including a bracket, a plurality of hinges relatively offset horizontally, an arm supported by said hinges and comprised of an inner and an outer complementary section, said arm being capable of displacement outwardly on said bracket in substantially the same horizontal plane as that of its normal inoperative position, said hinges causing a relative longitudinal displacement in opposite directions of the complementary sections, said complementary sections being retained in relatively parallel positions by means of slots and bolts correspondingly positioned in the respective sections, said complementary sections having an upper longitudinal flange in which are evenly spaced recesses offset in relation to each other for receiving the hanging hook of conventional hangers, said recesses, in normal position, being opposingly offset in uniformity.

4. In supporting devices for closets, a supporting member having a bracket, relatively offset hinges to which are operatively attached two complementary sections of an arm, said arm being displaceable in a horizontal plane substantially identical with that of its normal position within a closet, such displacement of said arm resulting in a relative longitudinal displacement in opposite directions of the two complementary sections, said complementary sections being retained in their relative positions by means of slots and bolts common to both and having upper flanges in which are uniformly spaced recesses so spaced that when said complementary sections are extended in longitudinal displacement they are opposingly offset in relation to each other in uniformity.

5. A supporting member including a bracket to which is operatively mounted, by means of a plurality of hinges horizontally offset in relation to each other, an arm comprised of two complementary sections retained in relative parallel position by means of corresponding slots and pins common to both, said arm being displaceable in substantially the same horizontal plane as that of its normal position within a cabinet, displacement of said arm causing relative longitudinal displacement of said complementary sections, said recesses being for the purpose of receiving and retaining the hooks of hangers and being evenly spaced so that, in normal position, they are opposingly offset in relation to each other in uniformity.

JOHN P. JOHNSON.
LEONARD C. TEAGUE.

REFERENCES CITED

The following references are of record in the file of this patent:

UNITED STATES PATENTS

| Number | Name | Date |
| --- | --- | --- |
| 975,069 | Richardson et al. | Nov. 8, 1910 |
| 1,054,241 | Richardson et al. | Feb. 25, 1913 |
| 1,833,147 | Atkinson | Nov. 24, 1931 |
| 1,940,951 | Hortenau | Dec. 26, 1933 |